United States Patent
Dunlap et al.

[15] 3,693,451
[45] Sept. 26, 1972

[54] FALLING WEIGHT GRAVITY GRADIOMETER

[72] Inventors: Henry F. Dunlap, 7422 Rosemont Rd., Dallas, Tex. 75217; William M. Campbell, 1521 Atlanta, Irving, Tex. 75060

[22] Filed: Aug. 12, 1970

[21] Appl. No.: 63,089

[52] U.S. Cl. ................................................73/382
[51] Int. Cl. ..............................................G01v 7/14
[58] Field of Search.......................................73/382

[56] References Cited

UNITED STATES PATENTS 3,011,346 12/1961 Garvin..........................73/382
3,429,184 2/1969 Russell ........................73/382

*Primary Examiner*—James J. Gill
*Attorney*—Blucher S. Tharp and Robert E. Lee, Jr.

[57] ABSTRACT

A gravity gradiometer based on dual free-falling objects in an evacuated vessel. A laser light source generates a beam of coherent light which is split into two measuring beams by optical dividing means. Light reflective means directs the measuring beams in vertical pathways so that one of the beams strikes one object and the other beam strikes the other object. Light reflectors mounted on the objects return the measuring beams to an optical combining means which combines them into a single output beam. Photodetector means optically coupled to the output of the optical combining means produces a signal determinative of the movement of the objects relative to each other during free fall.

5 Claims, 8 Drawing Figures

PATENTED SEP 26 1972 3,693,451

INVENTORS
Henry F. Dunlap
William M. Campbell

BY Robert Ellsworth Lee

ATTORNEY

INVENTORS
Henry F. Dunlap
William M. Campbell

BY Robert Elsworth Lee

ATTORNEY

FALLING WEIGHT GRAVITY GRADIOMETER

BACKGROUND OF THE INVENTION

This invention relates to gravity meters and particularly to a gravity gradiometer for measuring the gravity gradient due to differences of acceleration of gravity on two free-falling objects.

Various gravity meters are known in the art for measuring the acceleration of gravity including devices for measuring gravity gradients.

U.S. Pat. No. 3,011,346 (Garvin) shows an apparatus for gravity gradient surveying by detecting the difference in the refractive index of a fluid medium having particles suspended therein. A pair of fluid filled tubes are vertically displaced from each other and an electrical field is applied to reduce the tendency of their particles to settle out. An interferometer detector system is used to detect any relative change in refractive index of the fluids and serves to measure the vertical gravity gradient.

U.S. Pat. No. 3,038,338 (Boitnott) shows an airborne gravity gradient system having vertically spaced gravity responsive masses which are interconnected so that movement of one is accompanied by opposite movement of the other. Movement of the masses is monitored by a capacitance bridge and any change in vertical spacing corresponds to the differential influence of gravity.

U.S. Pat. No. 3,180,151 (Gustafsson) shows an instrument for aerial measurement of derivatives of the earth's gravity field whereby two masses are supported on vertical alignment in an evacuated chamber. The masses are supported by interconnecting frames so that the mean gravity effect is balanced, while the first derivative of the vertical component actuates the instrument. A capacitance bridge is used to detect movement of the masses.

However, none of the gravity gradient measuring systems previously proposed have been commercially successful. What really is needed is a gradiometer based on the falling weight system used in making absolute gravity measurements. Reference is made to U.S. Pat. No. 3,429,184 (Russel) which shows an optical device for measuring the acceleration of gravity using a freely falling optical reflector, a laser light source, and an interferometer. The device has an absolute accuracy of one part in $10^7$, is insensitive to temperature changes, and allows for rapid measurements.

SUMMARY OF THE INVENTION

The present invention is a falling weight gravity gradiometer having two spaced apart objects or weights contained in an evacuated vessel. The objects may be vertically and/or horizontally spaced in order to determine the vertical gradient, horizontal gradient, or the resultant of the vertical and horizontal gradients. A laser light source is employed in conjunction with optical dividing means to transmit a measuring beam toward each object. Light reflecting means on each object returns the measuring beams to an optical combining means where a single composite output beam is produced. The composite beam goes to photodetector means which produces a signal determinative of the movement of the objects relative to each other during free fall.

In a preferred embodiment of the invention, the two objects are vertically aligned so that they fall along a common axis. The bottom object has a centrally located aperture through which the measuring beam directed toward the upper object is transmitted. In still another embodiment, light dividing means is located in the aperture so that light is both reflected by the bottom object and transmitted through the dividing means toward the upper object. Light returned by the upper object is returned to the optical dividing means and a part is laterally reflected toward light absorbing means while a second part combines with the light returned by the bottom object to form a composite beam which goes to the photodetector means.

Another aspect of the invention is concerned with increasing the sensitivity of the gradiometer by using folded light paths, i.e. multiple reflections. One way this may be done is to multiply reflect the measuring beam going to one of the objects back and forth between the two objects a predetermined number of times before directing it to the photodetector means. Another way this may be done is to reflect light several times between one of the objects and a stationary reflector location on the far side of the other object. Still another aspect of the invention is concerned with generating and recording two independent signals measuring the gravity gradient each time a pair of weights is dropped. This is done by generating two measuring beams, each of which is partly reflected off of both of the weights. Each of the measuring beams leads to a different photodetector so that two concurrent fringe counts may be made for each gravity gradient determination.

DESCRIPTION OF THE PREFERRED EMBODIMENTS

Figure 1:
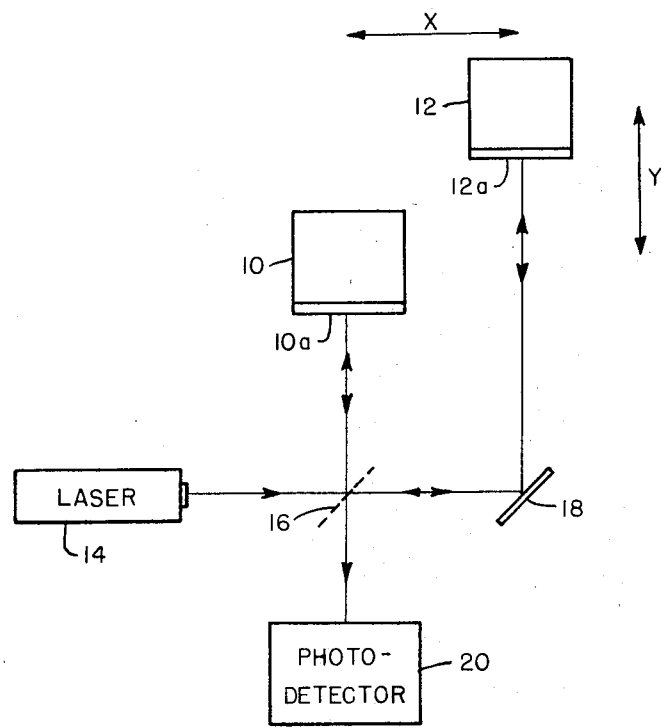
FIG. 1 illustrates the measurement of the vertical and/or horizontal gravity gradients by means of two free falling weights.

Referring to FIG. 1, objects 10 and 12 are free falling masses having their centers of gravity separated by horizontal distance X and vertical distance Y. Since objects 10 and 12 are located at different spatial points, it follows that their response to gravity will be different.

By observing the relative reaction of objects 10 and 12 during free fall in regard to the time it takes them to travel a predetermined distance or, conversely, the distance they travel in a predetermined time, the gravity gradient between them can be determined at the points or times of observation, respectively. If X is minimal with respect to Y, the vertical gravity gradient is obtained and if Y is minimal with respect to X, the horizontal gradient is obtained. If both X and Y are significant factors, a gravity gradient is obtained which is the resultant of the vertical and horizontal gradients.

The relative reactions of objects 10 and 12 to gravity can readily be determined by application of the principles of interferometry. Laser 14 transmits a coherent beam of light which is divided into two parts by beam splitter 16. One part is directed toward object 10 and the other part is reflected off of mirror 18 toward object 12. Mirrors 10a and 12a on objects 10 and 12 return the incident beams to beam splitter 16 where they are recombined and focused on photodetector 20. Objects 10 and 12, being differently influenced by gravity, fall at different instantaneous velocities with the result that the recombined beam exhibits a series of fringes. By taking the fringe count over either a plurality of distance or time intervals, the gravity gradient can be calculated by well-known procedures.

Figure 2:
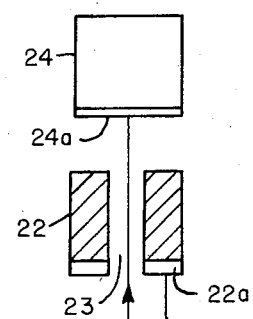
FIG. 2 illustrates a system for measuring the vertical gravity gradient by means of two free falling weights.

Referring to FIG. 2, a special embodiment of the invention for determining the vertical gradient of gravit is shown. Weights or masses 22 and 24 are vertically aligned so that in free fall they fall along the same vertical axis. Laser 26 transmits a beam of coherent light which is acted on by beam splitter 28. One part of the light beam is reflected upward so that it passes through cavity 23 and strikes mirror 24a on object 24. The other part of the beam strikes mirror 30 and is reflected upward so that it strikes mirror 22a on object 22. Mirrors 24a and 22a direct the beams back to beam splitter 28 where they are recombined into a composite beam which is transmitted to photodetector 32.

In actual practice, the beams of light are not lines as indicated but have finite widths; therefore, channel 23 may be made minutely small so that a portion of the light beam transmitted upward by beam splitter 28 is reflected off of mirror 22a while another part continues through channel 23 and is reflected off of mirror 24a. In this case, mirror 30 can be deleted since the two returned beams are already axially aligned; however, mirror 22a would have to be made slightly concave so that the returned beams will properly mix with each other.

Figure 3:
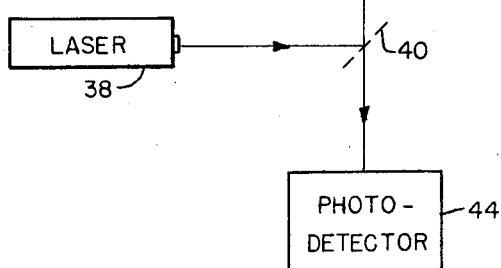
FIG. 3 gives an alternate embodiment for measuring the vertical gravity gradient by means of two free falling weights.

An alternate embodiment for determining the vertical gravity gradient is shown in FIG. 3 wherein any effects caused by rotation of objects 34 and 36 during free fall are eliminated. Laser 38 emits a beam of light which strikes beam splitter 40. Part of the beam is lost while the other part is reflected upward so that it passes into cavity 33. Beam splitter 34a is located in cavity 33 at the center of gravity of object 34 and is in the form of a tetrahedral prism. Part of the incident light beam is reflected by beam splitter 34a back toward beam splitter 40 while the other portion of the beam continues through channel 33 and into channel 35 of object 36. Mirror 36a is located at the center of gravity of object 36 and is also in the form of a tetrahedral prism. Light reflected by mirror 36a travels downward, re-entering channel 33 where part of it is laterally reflected by beam splitter 34a and strikes light absorbing means 42. The other portion passes through beam splitter 34a and recombines with the beam previously reflected by beam splitter 34a. The recombined beams pass through beam splitter 40 and strike photodetector 44. The trick to making this embodiment work is the combination of beam splitter 34a and light absorbing means 42 in such a manner as to prevent multiple reflections of light between beam splitter 34a and mirror 36a, i.e. objects 34 and 36.

Figure 4:
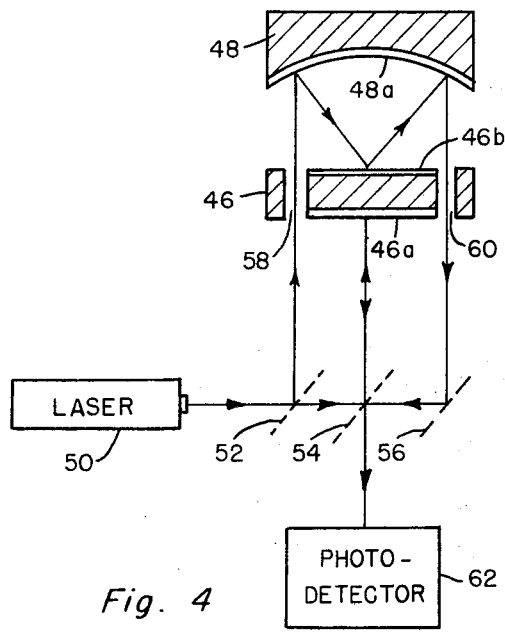
FIG. 4 depicts an arrangement for increasing the sensitivity of the invention by multiply reflecting light between the two falling weights.

Referring now to FIG. 4, a preferred form of the invention is disclosed which utilizes folding, i.e. reflection of a light beam between masses 46 and 48 a predetermined number of times, to increase sensitivity. Laser 50 transmits a beam of light which strikes tandemly arranged beam splitters 52 and 54. Light reflected upward from beam splitter 52 travels through channel 58 and strikes parabolic mirror 48a on object 48. At the same time, light reflected upward from beam splitter 54 strikes mirror 46a on object 46. Parabolic mirror 48a is designed to reflect incident light downward toward the center of mirror 46b on top of object 46. Mirror 46b, in turn, reflects the light back toward mirror 48a so that it is returned through channel 60 and strikes optical directing means 56. Beam splitter 54 combines the light returned from object 48 with the light reflected from object 46, forming a composite beam which is directed to photodetector 62.

Assuming the separation of objects 46 and 48 is one meter, then by this folding technique an effective separation of two meters has been achieved. If desired, this folding technique could be repeated a third time, a fourth time, etc., in order to achieve effective separation of 3 meters, 4 meters, etc. A beam splitter is used for optical directing means 56 instead of a mirror so that the two measuring beams will have the same relative intensity prior to mixing. In other words, assuming beam splitter 56 was a mirror, the beam reflected from object 46 would travel through beam splitters three times, whereas the beam reflected off of object 48 would travel through beam splitters only twice. By making 56 a beam splitter as shown, the beam returned by object 48 also travels through three beam splitters, thus balancing the intensities.

Figure 5:
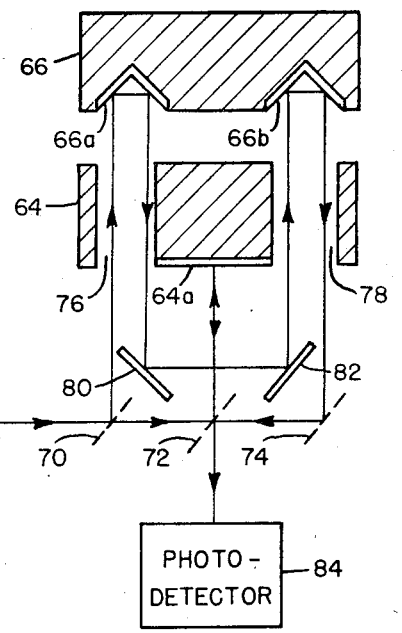
FIG. 5 shows an alternate design to FIG. 4 for increasing sensitivity by multiply reflecting light between one weight and a fixed reflector location.

Referring to FIG. 5, another procedure for increasing sensitivity by folding is shown in regard to objects 64 and 66. Laser 68 transmits a beam of light which intersects tandemly arranged beam splitters 70 and 72. The light is divided by bean splitter 70 so that a first part is reflected upward via channel 76 toward object 66 while a second part continues straight and impinges on beam splitter 72. The light reflected toward object 66 encounters retro mirror or corner cube 66a which returns a parallel beam shifted in position which strikes mirror 80. The incident beam is reflected by mirror 80 toward mirror 82 which in turn directs it upward again toward retro mirror or corner cube 66b. Light returned by retro mirror 66b is reflected by light directing means 74 toward beam splitter 72. In the meantime the light passed by beam splitter 70 is reflected upward by beam splitter 72 toward mirror 64a on object 64. The light beam reflected by mirror 64a is returned to beam splitter 72 where it is combined with the light beam that has been doubly reflected off of object 66. The resulting combined beam is directed to photodetector 84.

The results here are the same as in FIG. 4, i.e. the effective separation of masses 64 and 66 is twice that of their actual separation. Folding this time was achieved, however, by multiply reflecting a beam of light between the uppermost object and a series of fixed mirrors rather than back and forth between the two falling objects. As before, 74 is a beam splitter instead of a mirror in order to balance the intensities of the measuring beams before they are recombined.

Figure 6:
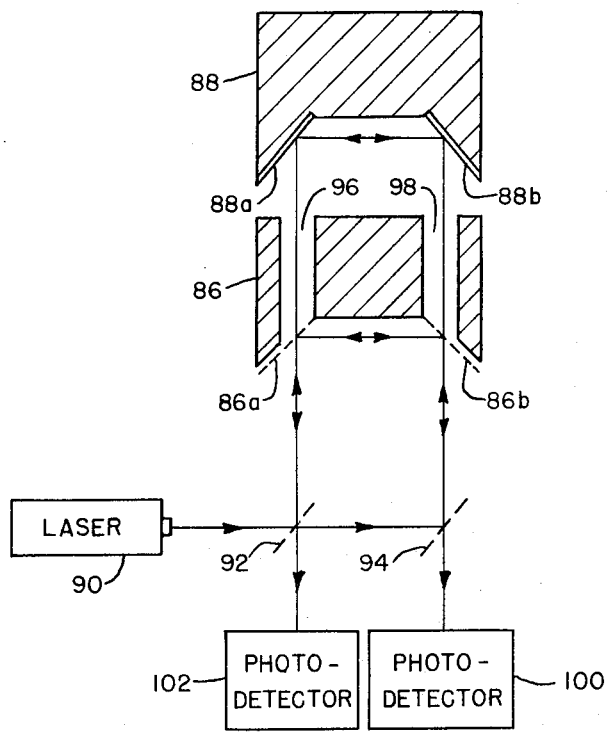
FIG. 6 shows a system for making two concurrent determinations of the vertical gravity gradient.

Another embodiment of the invention based on falling weights 86 and 88 is shown in FIG. 6. Laser 90 produces a beam of light which strikes tandemly arranged beam splitters 92 and 94. Light reflected upward by beam splitter 92 strikes beam splitter 86a on object 86. Part of this light is reflected laterally so that it strikes beam splitter 86b and is reflected downward to beam splitter 94. The other part of the light passes through beam splitter 86a through channel 96 and strikes mirror 88a on object 88. Light is reflected from mirror 88a to mirror 88b which in turn reflects it downward via channel 98 so that it passes through beam splitter 86b and also arrives at beam splitter 94. This first signal impinges on photodetector 100. Meantime, light which passes through beam splitter 92 is reflected upward by beam splitter 94 so that it intersects beam splitter 86b. A portion of this light is laterally reflected by beam splitter 86b toward beam splitter 86a where it is returned to beam splitter 92 while the other part travels upward through channel 98 and strikes mirror 88b on object 88. Light is reflected from mirror 88b to the left, striking mirror 88a which reflects it downward through channel 96 and beam splitter 86a to beam splitter 92. This second signal impinges on photodetector 102.

It will be seen that the above embodiment enables one to make two gravity gradient determinations for each weight drop. If the two readings are essentially the same, the data is accepted and if they differ, the data is rejected and a rerun at that point is made. If the weights wobble or rotate during free fall, different readings will be obtained and the data will be automatically rejected.

Figure 7:
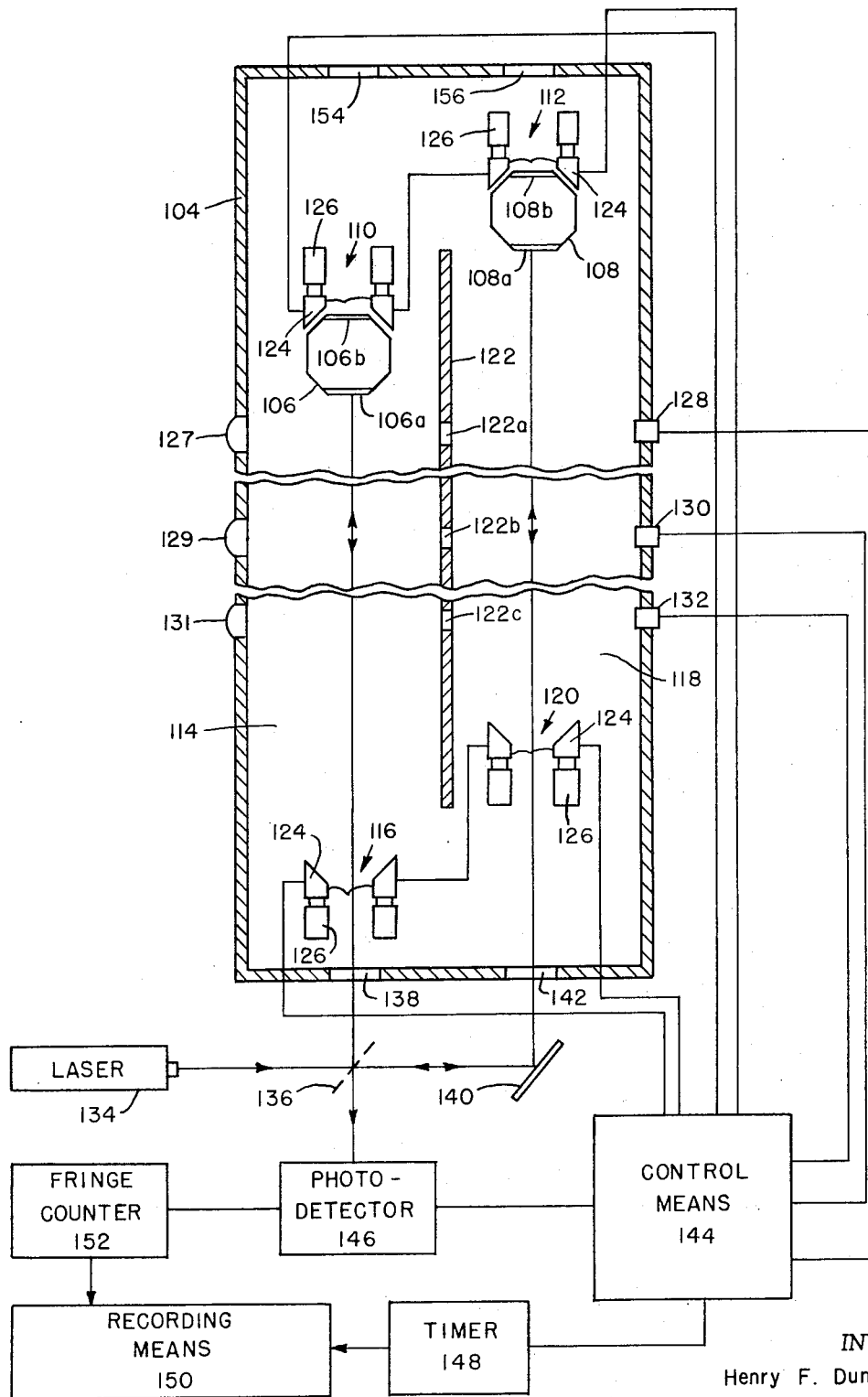
FIG. 7 is a schematic drawing of a working embodiment of the invention based on the design shown in FIG. 1.

Referring now to FIG. 7, a schematic working embodiment of the invention is disclosed based on the arrangement of weights shown in FIG. 1. Weights or bodies 106 and 108 are both horizontally and vertically spaced apart in vacuum chamber 104. Object 106 is held by catch-release means 110 and object 108 is held by catch-release means 112. Object 106 is designed to fall through channel 114 and land on catch-release means 116 and object 108 is designed to fall through channel 118 and land on catch-release means 120. Channels 114 and 118 are separated by interior partition 122 and in actual practice have diameters only slightly larger than objects 106 and 108. Catch-release means 110, 112, 116, and 120 are comprised of electromagnets 124 and hydraulic cylinders 126. Objects 106 and 108 are constructed of a metallic material having magnetic properties so that they can be held in drop positions by electromagnets 124. When one of the objects falls on one of the catch-release means, hydraulic fluid is forced from one chamber to another in hydraulic cylinders 126, absorbing the shock of the fall. The progress of the objects during free fall is followed by observing when the objects intersect the light beams going to photocells 128, 130, and 132. Light source 127 generates a beam which passes through optical window 122a in partition 122 and strikes photocell 128; light from source 129 travels through optical window 122b and strikes photocell 130; and light from source 131 travels through optical window 122c and strikes photocell 132.

In operation, laser 134 generates a beam of coherent light which strikes beam splitter 136 where it is divided into two parts. One part is reflected upward through optical window 138 into vacuum chamber 104. The portion of light which travels through beam splitter 136 strikes mirror 140 and is reflected upward through optical window 142 into chamber 104. Light passing through window 138 strikes mirror 106a and light traveling through window 142 strikes mirror 108a on objects 106 and 108, respectively. When it is desired to make a drop, control means 114 is actuated to interrupt the power to electromagnets 124 in catch-release means 110 and 112. Weights 106 and 108 then being to fall. When the bottommost weight 106 interrupts the beam of light to photocell 128, control means 144 starts photodetector 146 and timer 148. The time of arrival of objects 106 at photocells 130 and 132 is accurately determined by timer 148 and recorded on recording means 150. Similarly, the arrival of weight 108 as it passes photocells 128, 130, and 132 is recorded. When object 108 passes a beam of photocell 132, the control means turns off photodetector 146 and timer 148. Fringe counter 152 counts the number of fringes in the composite beam returned by objects 106 and 108 as detected by photodetector 146. The fringe count is recorded on recording means 150 in conjunction with the time signal from timer 148. When objects 106 and 108 complete their fall, they are caught by catch-release means 116 and 120, respectively. Electromagnets 124 in catch-release means 116 and 120 are energized to hold weights 106 and 108.

A repeat drop can now be made simply by inverting chamber 104 so that catch-release means 116 and 120 are on top and catch-release means 110 and 112 are on the bottom. Light from laser 134 is reflected off of beam splitter 136 and mirror 140 so that two measuring beams are produced which pass through optical window 154 and 156 and strike mirrors 106b and 108b on objects 106 and 108, respectively. Weights 106 and 108 can now be released following the same procedure outlined above in order to make another gravity gradient determination.

Figure 8:
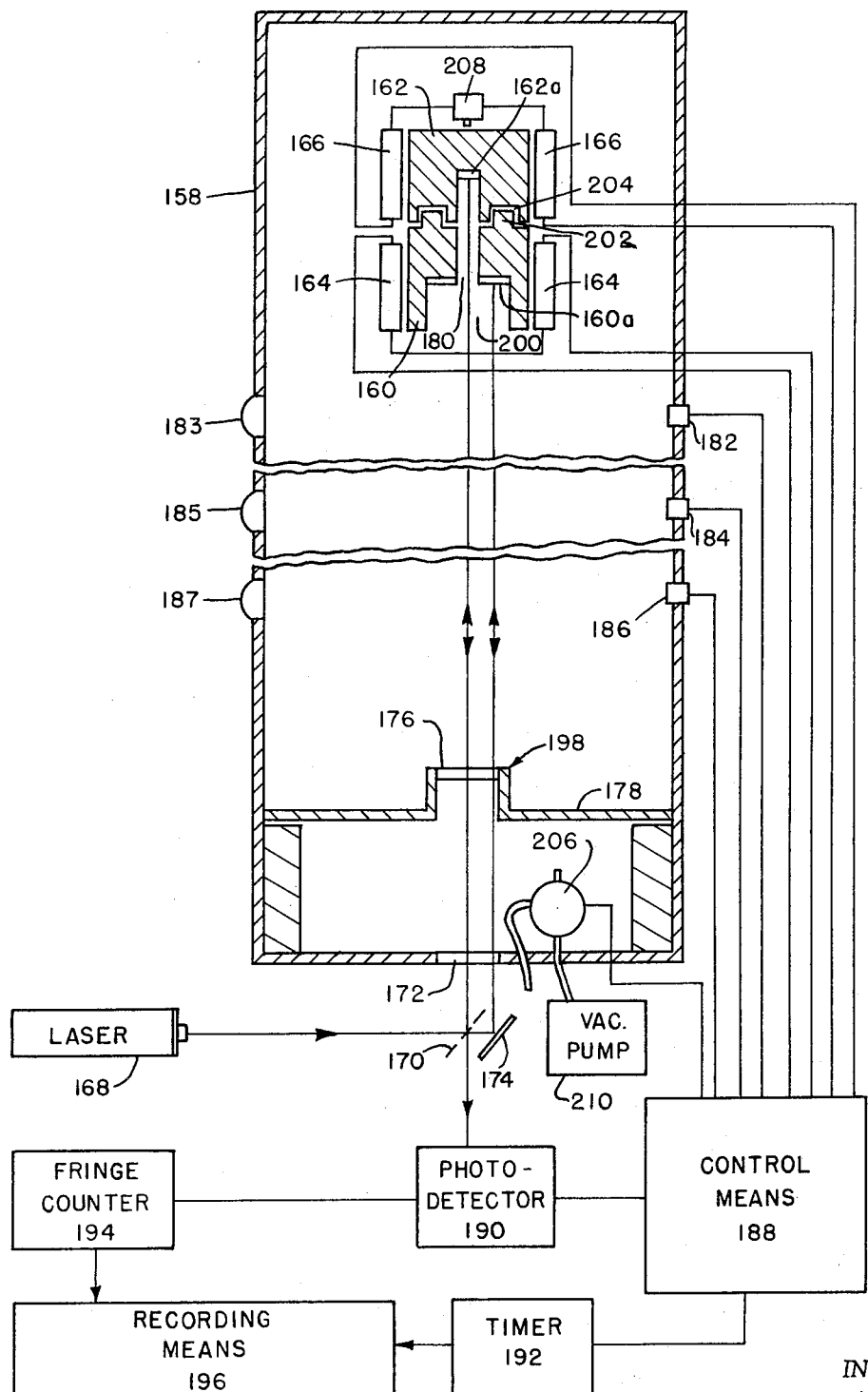
FIG. 8 is a schematic drawing of a working embodiment of the invention based on the design shown in FIG. 2.

Referring finally to FIG. 8, a schematic working embodiment of the invention is disclosed based on the embodiment shown in FIG. 2. Vacuum chamber 158 has vertically stacked weights or objects 160 and 162. Object 160 is held in position by electromagnets 164 and object 162 is held in position by electromagnets 166. Laser 168 produces a beam of light which strikes beam splitter 170. One part is reflected upward through optical window 172 in chamber 158 and the other part strikes mirror 174, also being reflected upward through optical window 172. Both beams then pass through window 176 on platform 178 and strike mirrors on weights 160 and 162. The beam reflected upward from beam splitter 170 strikes mirror 162a and the beam reflected upward by mirror 174a strikes mirror 160a. (As explained in conjunction with FIG. 2, if desired, channel 180 may be made so small in diameter that mirror 174 may be dispensed with and a single beam of light may be used to strike both mirrors 162a and 160a.) Platform 178 is movably disposed in chamber 158 as will be subsequently explained. The progress of weights 160 and 162 during free fall is measured by photocells 182, 184, and 186 by interruption of beams from light sources 183, 185, and 187, respectively.

In operation, light from laser 168 is reflected off of mirrors 160a and 162a and objects 160 and 162 are dropped by actuating control means 188 to turn off the power to electromagnets 166 and 164. This is done in a predetermined time sequence so that objects 160 and 162 will be given the desired distance of separation during free fall. In other words, object 160 is released first and after a short time interval object 162 is released. The objects could be released at the same time; however, this would require that chamber 158 be longer in order to have the desired separation which may be inconvenient for airborne operations. When object 160 passes photocell 182, control means 188 starts photodetector 190 and timer 192. Fringe counter 194 counts the fringes detected by photodetector 190 and records them on recording means 196 in conjunction with the time signal from timer 192. The passage of objects 160 and 162 by photocells 182, 184, and 186 is recorded on recording means 196 along with the fringe count. At conclusion of their fall, object 160 lands on platform 178 and object 162 lands on top of object 160. Spindle 198 protrudes upward from platform 178 and engages with cavity 200, thereby holding object 160 firmly in position. Object 160 has circular rim 202 adapted to engage with and fit into cavity 204 in order to hold object 162.

When it is desired to return objects 160 and 162 to their starting positions for another weight drop, valve means 206 is actuated by control means 188 to admit air into the area of chamber 158 below platform 178. This causes platform 178 to shoot upward carrying weights 160 and 162. When object 162 engages switch 208, control means 188 actuates electromagnets 166 and 164, holding weights 160 and 162 in place. Valve means 206 is now actuated by control means 188 so that it is connected to vacuum pump 210. Once the vacuum is re-established in the area of chamber 158 below platform 178, the pressure is equalized and platform 178 returns to the position shown in the drawing. The apparatus is now ready for another weight drop to be performed, thus completing the cycle.

What is claimed is:

1. A gravity gradiometer for determining the vertical gradient comprising:

a. a vessel capable of holding a vacuum,
b. first and second vertically aligned objects contained within said vessel adapted for simultaneous free fall along the same vertical axis, said first object having an aperture exposing said second object,
c. a laser light source,
d. optical dividing means for dividing light from said source into two separate measuring beams,
e. light reflective means for directing said measuring beams in vertical pathways so that one of said beams strikes said first object and the other beam passes through the aperture and strikes said second object,
f. light reflective means mounted on each of said objects for reflectively directing said measuring beams so that they are returned to predetermined receiving locations,
g. optical combining means for combining the measuring beams returned by said light reflective means into a single beam, and
h. photodetector means optically coupled to the output of said combining means for producing a signal determinative of the movement of said objects relative to each other during free fall.

2. A gravity gradiometer according to claim 1 where a beam splitter located in said aperture acts as light reflective means for returning the measuring beam from said first object.

3. A gravity gradiometer according to claim 1 where additional light reflective means are located on said objects for multiply reflecting at least one of said beams between said objects prior to returning the beam to its receiving location.

4. A gravity gradiometer according to claim 1 where stationary light reflective means are included below the fall path of one of said objects so that the measuring beam directed toward said object can be multiply reflected between said stationary light reflective means and said object during free fall.

5. A gravity gradiometer according to claim 1 where there are two photodetector means and two optical combining means for producing two output signals, one of said objects having beam splitting means and the other object having mirrors arranged in combination with said beam splitting means so that each of said measuring beams is reflected in part by each of said objects with one measuring beam going to one photodetector and one to the other.

* * * * *